US007024535B2

(12) United States Patent
Fougeroux et al.

(10) Patent No.: US 7,024,535 B2
(45) Date of Patent: Apr. 4, 2006

(54) METHOD FOR DYNAMICALLY ALLOCATING MEMORY WORKSPACE BY ELEMENTARY MEMORY BLOCKS TO A DATA STRUCTURE, AND CORRESPONDING ONBOARD SYSTEM

(75) Inventors: Nicolas Fougeroux, Le Chesnay (FR); Patrice Hameau, Boulogne Billancourt (FR); Olivier Landier, Paris (FR)

(73) Assignee: CP8 Technologies, Louveciennes (FR)

( * ) Notice: Subject to any disclaimer, the term of this patent is extended or adjusted under 35 U.S.C. 154(b) by 216 days.

(21) Appl. No.: 10/471,322

(22) PCT Filed: Dec. 20, 2001

(86) PCT No.: PCT/FR01/04126

§ 371 (c)(1),
(2), (4) Date: Sep. 9, 2003

(87) PCT Pub. No.: WO02/50661

PCT Pub. Date: Jun. 27, 2002

(65) Prior Publication Data

US 2004/0215913 A1 Oct. 28, 2004

(30) Foreign Application Priority Data

Dec. 21, 2000 (FR) .................................. 00 16722

(51) Int. Cl.
*G06F 12/02* (2006.01)

(52) U.S. Cl. ...................... 711/170; 711/171; 711/173; 707/205; 707/206

(58) Field of Classification Search ................ 711/170, 711/115; 235/380
See application file for complete search history.

(56) References Cited

U.S. PATENT DOCUMENTS 4,882,474 A * 11/1989 Anderl et al. ............... 235/380
6,480,935 B1 * 11/2002 Carper et al. ............... 711/115

FOREIGN PATENT DOCUMENTS

| | | | |
|---|---|---|---|
| EP | 0686918 | A | 12/1995 |
| GB | 2324894 | A | 11/1998 |
| WO | WO 9510083 | A | 4/1995 |
| WO | WO 0116759 | A | 3/2001 |

* cited by examiner

*Primary Examiner*—Mano Padmanabhan
*Assistant Examiner*—Craig Evan Walter
(74) *Attorney, Agent, or Firm*—Anderson & Jansson; Pehr Jansson

(57) ABSTRACT

The invention concerns a method for dynamically allocating memory workspace of an onboard system to a data structure identified by an identification number ($ID\_A_k$) and the corresponding onboard system.

The storage area of the onboard system being subdivided into elementary memory blocks ($BL_1$), the method is implemented on the basis of an allocation instruction and an erasure instruction. To allocate (A) an elementary memory block, the method consists in assigning an identification number ($ID\text{-}A_k$) to the block concerned. To erase (E) an elementary storage block, the method consists in assigning an arbitrary value (AAAA) different from any identification number.

The system is applicable to onboard systems, such as multi-application microprocessor cards.

9 Claims, 4 Drawing Sheets

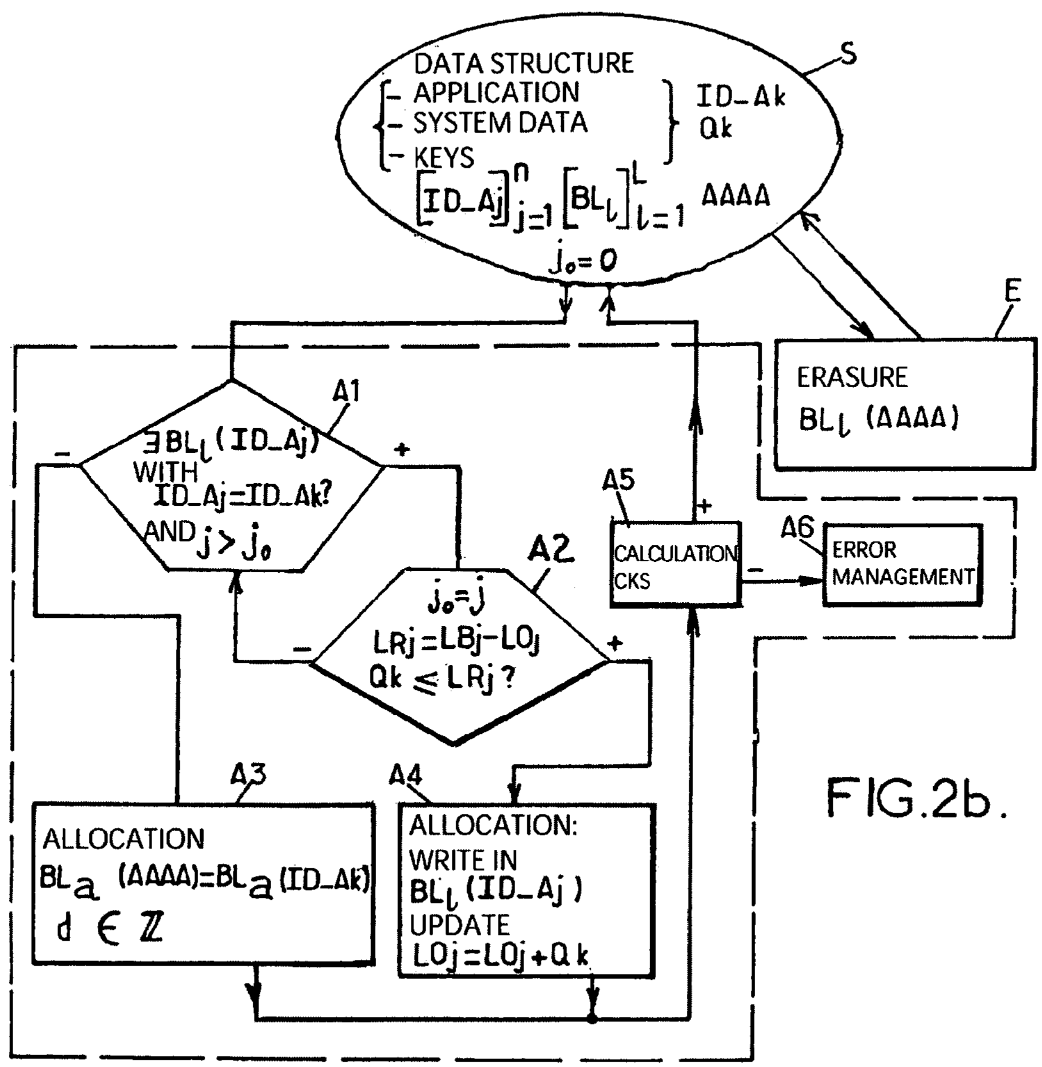
FIG. 2b.
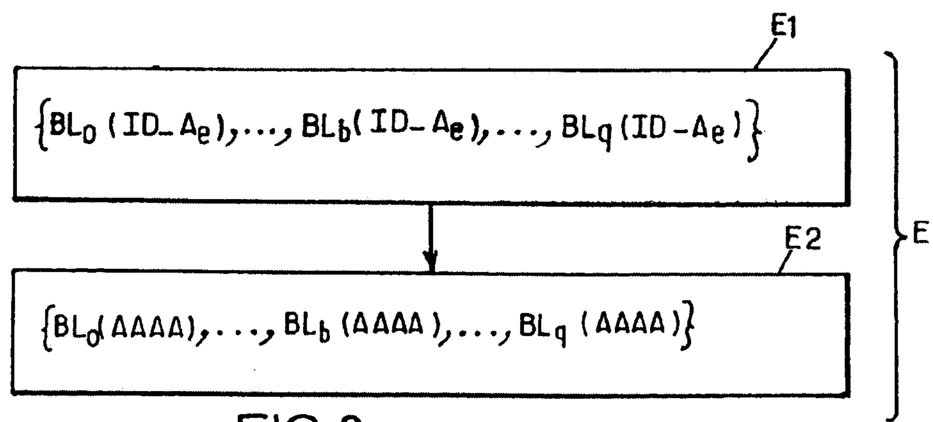
FIG. 3 APPLICATION ERASURE

METHOD FOR DYNAMICALLY ALLOCATING MEMORY WORKSPACE BY ELEMENTARY MEMORY BLOCKS TO A DATA STRUCTURE, AND CORRESPONDING ONBOARD SYSTEM

FIELD OF THE INVENTION

The invention concerns a method for dynamically allocating memory workspace by elementary memory blocks to a data structure in an onboard computer system, or onboard system, and the corresponding onboard system.

BACKGROUND OF THE INVENTION

The onboard systems, or current portable objects, such as the microprocessor cards or smartcards, PCMCIA cards and electronic assistants tend to perform more and more complex functions, due, in particular, to the installation of multiple application programs, the microprocessor or microcontroller cards being, in this case, known as multi-application cards.

A wide range of applications can be installed in this type of object, due to the flexibility of the current high level languages and their adaptability to the widest range of hardware elements through especially the implementation of virtual machines. In particular, in the framework of the developments in electronic cards with microprocessor or microcontroller, the installation of a large number of applications in this type of card is being considered, applications such as electronic purse, physical access control, access-control to services, for example pay TV programs or similar.

The installation of multiple applications on these portable objects is made possible, firstly, by the miniaturisation of electronic circuits and correlative increase in memory capacity of smartcards and, secondly, by the increase in computation power of the central processing units.

However, the multiplication of applications installed on this type of equipment raises the crucial problem of optimised dynamic memory allocation.

As shown on FIG. 1, the portable object, for example, a microprocessor card and referenced 10, includes the traditional input/output circuits, I/Os, referenced 12, information processing resources, referenced 14, composed of a microcontroller and connected to the input/output circuits 12. In addition, a non volatile memory 18 is planned, which consists of programmable memory 18*a* and a ROM type read only memory 18*b*. These memories are connected to the microcontroller or microprocessor 14. Lastly, a working memory, RAM memory, referenced 16, is also planned and connected to the microprocessor. The above-mentioned links are BUS links.

The assembly is managed by an operating system OS, which can be installed in non volatile memory 18. In addition, in some cases, the multi-application portable object may include a cryptographic computation unit SI, referenced 20, itself connected to the microprocessor 14.

The microprocessor itself can be replaced or completed by logic circuits installed in a semiconductor chip, these logic circuits possibly being ASIC (Application Specific Integrated Circuit) type.

We know from document WO 01/16759 registered before this application but published after, a method for allocating memory divided into data blocks in a smartcard.

In order to rationalise the management of the memory workspace available on any computer system, in particular for an onboard system such as a microprocessor or a microcontroller card as shown on FIG. 1, this invention concerns the implementation of a method for dynamically allocating memory workspace by elementary memory blocks to a data structure, the data structures corresponding either to applications as such, to system data used to implement the operating system, or to specific security data such as encryption/decryption access keys or other. The notion of dynamic allocation includes allocation and/or erasure of allocated memory.

This system also concerns, in the context of the above-mentioned rationalisation, finding out quickly to which application or data structure each byte stored in storage area belongs.

This system also concerns the implementation of a method for dynamically allocating memory by elementary memory blocks to a data structure in order to avoid or reduce any crumbling, or fragmentation, phenomenon, during the memory allocation/erasure process.

Lastly, this system also concerns the implementation of a method for dynamically allocating memory by elementary memory blocks, in which the memory integrity is guaranteed by checking the value of each elementary memory block allocated.

SUMMARY OF THE INVENTION

The method for dynamically allocating memory workspace to a data structure identified by an identification number and stored as digital information packets in the storage area of an onboard system, subject of this invention, is remarkable in that, the storage area being subdivided into elementary memory blocks, it is implemented from at least one elementary memory block erasure instruction and one elementary memory block allocation instruction, through which this elementary memory block is associated with a reference to this identification number. To allocate an elementary memory block, this method consists in assigning to the reference to the identification number the value of this identification number. To erase an elementary memory block, this method consists in assigning to the reference to the identification number an arbitrary value set a priori, different from any identification number.

The multi-application onboard system, subject of this invention, includes an operating system managing the input/output circuits, the arbitrary access memory and the non volatile memory via a microprocessor. It is remarkable in that it comprises in non volatile memory a table to manage the storage area by elementary memory blocks, this table comprising at least, for each elementary memory block, a reference to an identification number of the data structure to which the corresponding elementary memory block has been allocated and a value of memory workspace occupied in the corresponding elementary memory block assigned.

The method subject of the invention is applicable to dynamically allocating memory workspace in any onboard computer system, but more especially in any portable object such as a microprocessor or a microcontroller card, in which the memory resources are reduced, due to its limited size.

BRIEF DESCRIPTION OF THE DRAWINGS

It will be easier to understand the method and the multi-application onboard system subject of the invention on reading the description below, written with reference to the accompanying drawings, apart from FIG. 1 which concerns the prior art:

FIG. 2*b* represents, as an illustration, a functional flowchart of a preferential variant for implementation of the method for dynamically allocating memory subject of this invention, as illustrated on FIG. 2*a;*

FIG. 3 represents, as an illustration, a preferential variant for implementation of the method subject of this invention, during an operation to erase a data structure such as an application;

DETAILED DESCRIPTION

Figure 2A:
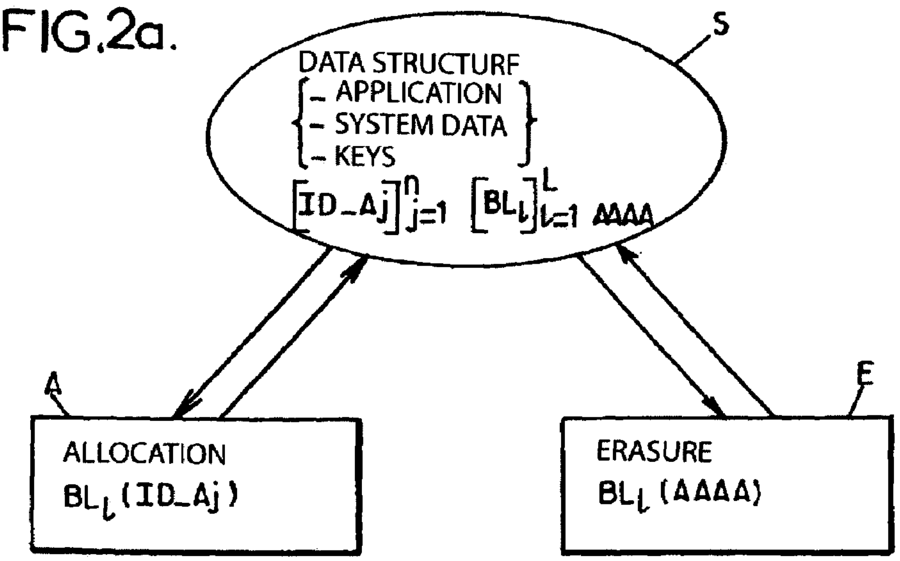
FIG. 2*a* represents a functional flowchart illustrating steps used to implement the method for dynamically allocating memory subject of this invention.

We will now give a more detailed description of the method for dynamically allocating memory by elementary memory blocks to a data structure, subject of this invention, referring to FIG. 2*a* and the following figures.

FIG. 2*a* represents a functional flowchart of the main steps used to implement the method for dynamically allocating memory subject of this invention, this functional flowchart corresponding in fact to a state diagram of the above-mentioned main steps.

Figure 1:
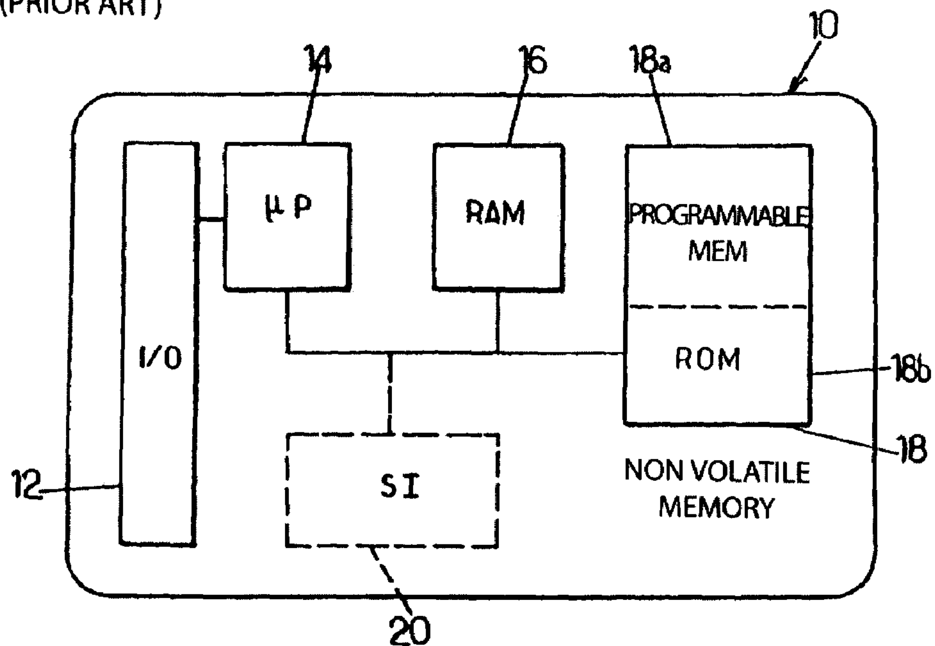

In particular, we see that step S corresponds to an initial state in which a data structure, formed by an application, by system data, if necessary specific numerical values or keys, must be stored, i.e. installed in the event of applications, for example in the storage area of an onboard system whose structure corresponds to that previously described in the description referring to FIG. 1.

We see in particular that each data structure is identified by an identification number written $ID\_A_j$ where j can take values between 1 and n, n indicating the total number of data structures likely to be stored or installed in the above-mentioned memory workspace.

In addition, to implement the method subject of this invention, we indicate that the memory workspace subject to the method for dynamically allocating memory subject of this invention, is advantageously subdivided into memory blocks, each memory block written $BL_1$, where 1 can vary from l=1 to 1 =L, consists of a given number of bytes.

In a non-limiting preferential mode of realisation, we indicate that the number of constituent bytes in each block $BL_l$ can be a power of 2 in order to simplify the addressing of each memory block and in each memory block so defined. In a mode of realisation given as a non-limiting example, we indicate that each block may comprise 256 bytes. In the initial step S, all identification numbers are written $[ID^{-A}{}_j]_{j=1}{}^n$ and all blocks $[BL_l]_{l=1}{}^L$.

Lastly, as part of the implementation of the method subject of this invention, we use an arbitrary numerical value, written AAAA, this arbitrary numerical value having a specific function which will be described below in the description, in order to implement the method for dynamically allocating memory subject of the invention.

Generally, remember that each data structure, i.e. applications, system data, specific numerical values or keys, identified by the identification number $ID\_A_j$ can be stored as packets of digital information in the storage area of the above-mentioned onboard system.

By packets of digital information, we mean firstly packets of digital data representative of an object code used to install and execute an application for example, system data or keys, or specific numerical values, representative of packets of application data generated by one or more applications installed on the corresponding onboard system, or intermediate digital data allowing the operating system to manage the assembly in order to execute the various features of the onboard system using the above-mentioned system data, keys or intermediate numerical values.

As shown on FIG. 2*a*, we indicate that the method for dynamically allocating memory by elementary memory blocks to a data structure, subject of the invention, is implemented from at least one elementary memory block $BL_l$ allocation instruction, allocation operation written A in which a reference to the identification number of the data structure or application considered is associated with the above-mentioned elementary memory block and from at least one elementary memory block erasure instruction, instruction corresponding to the operation E shown on FIG. 2*a*.

In particular, and according to a remarkable aspect of the allocation method subject of this invention, the allocation operation A, to allocate an elementary memory block, consists in assigning the value of the identification number $ID\_A_j$ to the reference to the identification number associated with the elementary memory block considered.

Whereas in the memory allocation methods of the onboard systems according to the prior art, the storage areas of the data structures, such as the applications, have a simple reference to the identification number of the data structure or corresponding application taking the form of a pointer, pointer to the start of storage of the data structure or application and pointer to the end of storage of the data structure or application considered, the allocation step A according to the subject of this invention consists in fact in assigning as reference to the identification number of the data structure or application, the value of the above-mentioned identification number to each block $BL_l$ in which the packets of digital information of object code or data are stored. We see in particular, as shown on FIG. 2*a*, that assigning the value of the identification number to the reference to the identification number consists in associating in a one to one relation the value of this identification number with the corresponding elementary memory block $BL_1$, this operation being written:

$$BL_l(ID\_A_j).$$

We therefore see that the above-mentioned one to one correspondence can be achieved by associating with each block $BL_l$ a data field representative of the value of the above-mentioned identification number $ID\_A_j$ in a table to manage the dynamic memory allocation of the storage area of the above-mentioned onboard system.

The complete structure of the above-mentioned table will be given later in the description.

According to another remarkable aspect of the method for dynamically allocating memory by elementary memory blocks according to the subject of this invention, we indicate, in reference to FIG. 2*a*, that the erasure step E consists, to erase an elementary memory block, in assigning to the reference to the identification number associated with the elementary memory block considered $BL_1$ an arbitrary value instead of the identification number of the data structure or application considered. This arbitrary value is of course the value AAAA mentioned earlier in the description. This arbitrary value is different from any identification number assigned to a given data structure.

FIG. 2*a* shows allocation A and erasure E steps connected to the initial state S by a double arrow, each double arrow representing of course the call of the allocation function or instruction A, respectively of the erasure function or instruction E, the allocation respectively erasure operations being carried out as described previously, and the return arrow representing an acknowledgement sent to the initial state S.

A more detailed description of a preferential mode of implementation of the method for dynamically allocating memory by elementary memory blocks according to the subject of this invention, will now be given in reference to FIG. 2*b*.

The method subject of this invention, in the mode of realisation of FIG. 2*b*, may correspond to a process to allocate memory to data generated by an application for example, or if necessary obtained by loading or downloading application updates, the digital information packets, in both cases, possibly corresponding to those of an application or data structure already installed.

We therefore write:

$[ID\_A_j]_{j=1}^{n}$ all identification numbers of data structures already installed;

$[BL_l]_{l=1}^{L}$ all blocks likely to be used in the storage area considered;

$ID\_A_k$ the identification number of the data structure or application for which the memory allocation is required, $k \in [1,n]$;

$Q_k$ the memory workspace required for the digital information packets to which a corresponding memory workspace must be allocated.

In addition, a special index j is defined, written $j_0$, which is assigned the value 0.

Under these conditions, the allocation operation A, as shown on FIG. 2*b*, may consist, to allocate a given elementary memory block, written $BL_l$, to the above-mentioned digital information packet $Q_k$, and prior to any step which consists in assigning to the reference to the identification number the value of the identification number, in checking for any elementary memory block already allocated, the identity of the reference to the identification number and the identification number of the corresponding data structure, in a step $A_1$. This identity check consists in carrying out a test which involves looking for the first memory block $BL_1$ whose associated identification number $ID\_A_j$ corresponds to the identification number $ID_{13}\ A_k$ of the data structure or application for which the allocation must be carried out.

The above-mentioned test is written:

$$\exists\ BL_l(ID\_A_j) \text{ with } ID\_A_j = ID\_Ak \text{ ? and } j > j_0$$

If a negative response is obtained to the test A1, which consists in looking for the next block belonging to the application whose identification number is $ID\_A_k$, an instruction to allocate a free elementary memory block is called in step A3, none of the possible memory blocks already allocated to the application whose identification number is $ID\_A_k$ having sufficient free space to contain the information packet $Q_k$.

On FIG. 2*b*, the call of the allocation instruction of the next elementary memory block is written:

$$BL_a(AAAA) = BL_a(ID\_A_k).$$

The above-mentioned instruction to allocate the next elementary block can therefore be used to allocate an elementary memory block of address a, a being any offset value, $a \in N$ the set of natural integers. The elementary memory block chosen is of course an elementary block to which the arbitrary value AAAA was previously assigned and therefore corresponds to an erased block, i.e. a free block ready for any allocation and storage operation for the corresponding information packet $Q_k$.

A positive response to test $A_1$ indicates that the elementary memory block which has just been found is at least partly allocated to the data structure or application for which the allocation must be carried out.

If a positive response is obtained to the above-mentioned test $A_1$, the allocation method then consists in checking, in a test $A_2$, that there is sufficient memory workspace in the above-mentioned current elementary memory block $BL_l(ID\_A_j)$ to store the above-mentioned digital information $Q_k$.

On FIG. 2*b*, the check in test $A_2$ that there is sufficient memory workspace involves setting the special index $j_0$ to value j and is written:

$$LR_j = LB_j - LO_j \text{ and } Q_k \leqq LR_j?$$

relation in which $LR_j$ designates the remaining memory workspace for the current elementary memory block, $LB_j$ designates the total memory workspace of each current elementary block, i.e. 256 bytes in the mode of realisation indicated above, and $LO_j$ designates the memory workspace occupied in the above-mentioned current elementary memory block.

If a positive response is obtained to the check test $A_2$, the information packet $Q_k$ requiring memory workspace less than the memory workspace of the current elementary memory block, in a step $A_4$, the above-mentioned current elementary memory block $BL_l(ID\_A_j)$ can be allocated to the information packet $Q_k$, it being possible to store the digital information packet $Q_k$ in the free storage area of the above-mentioned current elementary memory block. Consequently, the allocation step $A_4$ consists in writing the information packet $Q_k$ in the block $BL_l(ID\_A_j)$ and in updating the value of the memory workspace occupied in the block, written:

$$LO_j = LO_j + Q_k.$$

If a negative response is obtained to the check test $A_2$, the current block $BL(ID\_A_{j0})$ not having enough free space to contain the information packet Qk, it is necessary to return to step A1 to look for a new block whose identification number is $ID\_A_k$ and which has not yet been analysed during this allocation.

Obviously, the allocation steps as such $A_3$ and $A_4$ are followed by a return to the initial state S.

In a non-limiting preferential mode of realisation, we indicate that after the allocation steps $A_3$ and $A_4$, and therefore after allocating an elementary memory block to an application and of course to the storage by writing digital information, i.e. the information packet $Q_k$ by writing this information in the elementary memory block allocated, the allocation method according to the subject of this invention may consist in addition in calculating, in a step $A_5$, a checksum for the elementary memory block allocated, this operation being designated by calculation CKS on FIG. 2*b*.

Generally, we indicate that for the implementation of step $A_5$, the checksum calculation can be carried out using traditional checksum calculation means, these calculation means may in fact correspond to the specialised calculation circuit 20 contained in the traditional onboard systems, as described previously in the description. A traditional error management step $A_6$ can be planned.

Figure 2C:
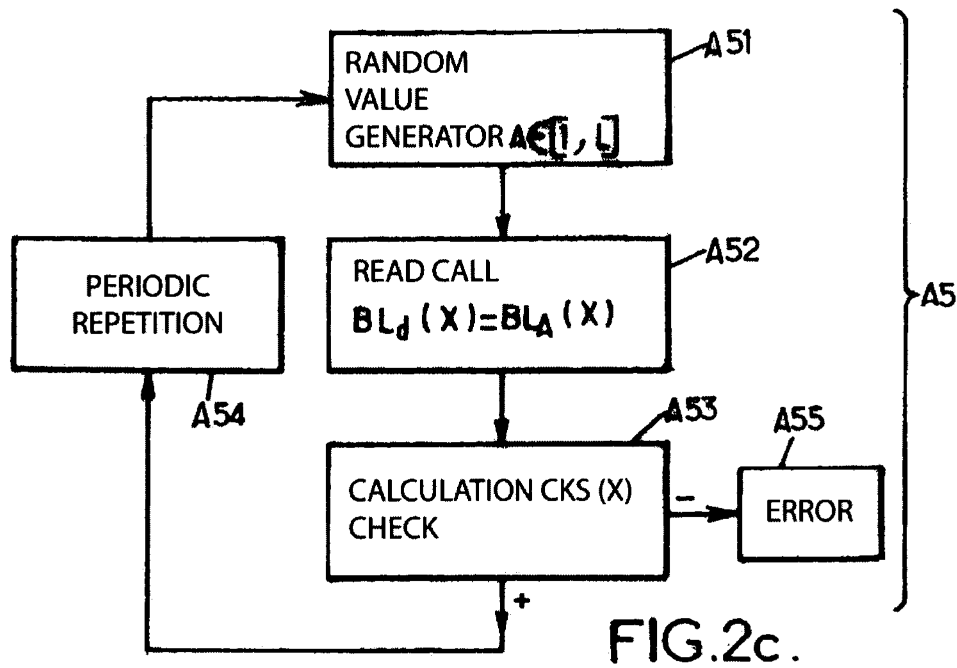
FIG. 2*c* represents, as an illustration, a special mode of realisation of the checksum computation process.

A preferential mode of realisation of the elementary memory block checksum calculation is an asynchronous checking mode, as described on FIG. 2*c*.

As shown on the above-mentioned figure and preferably independently of any allocation of an elementary memory block to a data structure, the method for dynamically allocating memory subject of this invention may consist, for the implementation of step $A_5$, in selecting according to a random selection criterion one of the elementary memory blocks allocated. This selection operation using a random selection criterion is represented on FIG. 2*c* by the generation of a random value A in step $A_{51}$, this random value A possibly being between [1,L], then in a step $A_{52}$ consisting in a call to read the elementary memory block of address A, this operation being written on FIG. 2*c:*

$$BL_a(X)=BL_A(X).$$

In this relation, X designates the content of the elementary memory block $BL_A$ read.

The above-mentioned steps $A_{51}$ and $A_{52}$ are then followed by a step $A_{53}$ which consists in calculating a checksum for the elementary memory block allocated selected. Step $A_{53}$ is written "calculation CKS(X)". This checksum is then compared with a true value stored in the above-mentioned table, according to the checksum type process mentioned earlier in the description.

If a positive response is obtained to the above-mentioned check, according to a remarkable aspect of the method subject of the invention, the checksum calculation process may be triggered periodically by a step $A_{54}$ to return to step $A_{51}$, in order to reinitialise the generation of a different random value, then the call to read the corresponding elementary memory block by executing steps $A_{51}$ and $A_{52}$.

On the contrary, if a negative response is obtained in the checksum calculation step $A_{53}$, the checksum not being satisfied, an error return step $A_{55}$ may be called, in order to indicate a stored data or code integrity problem. The traditional error management, step $A_6$, may include blocking the onboard system, or an attempt to retrieve the data if an error-correcting code is used as checksum.

An example of specific implementation of the method for dynamically allocating memory by elementary memory blocks, according to the subject of this invention, will now be given below.

The method subject of the invention has been implemented for elementary memory blocks of 256 bytes, the following information being associated with each elementary memory block $BL_1$:

- identification number $ID\_A_j$ of the data structure or application: 1 byte;
- memory workspace occupied written $LO_j$: 1 byte; if necessary, the free memory workspace can be used;
- checksum: 2 bytes.

Preferably, as will be described later in the description, the previous information is stored for each elementary memory block in the form:

info block structure {byte $ID\_A_1$, byte $LR_j$, word CKS}

In the previous relation, a byte is 8 bits and a word is two bytes.

As regards the encoding of the identification number associated with each elementary memory block, the following encoding was used:

$ID\_A_j$=00h: free block, AAAA=00h,
- FFh: illegible system block,
- FEh: legible system block,
- FDh: specific value or key,
- 01h-FCh: elementary memory block belonging to the application with application identification number i, where i∈[01h,FCh].

For any $ID\_A_j$, $LR_j$ can take any value from 01h to FFh, value 00h also meaning that the current elementary memory block is fully used, no memory workspace being available in the block.

The method for dynamically allocating memory by elementary memory blocks, subject of this invention, can also be used to erase any data structure, or application, identified by an identification number very flexibly and efficiently, as described below and shown on FIG. 3.

Since a reference corresponding to the identification number is allocated to each elementary memory block, the corresponding erasure process may consist in collecting all blocks $BL_0$, $BL_b$ to $BL_q$ whose identification number $ID\_A_e$ corresponds to the application to be erased in step $E_1$ shown on FIG. 3, then in assigning to the reference to the identification number of all the elementary memory blocks allocated to the application considered the arbitrary value AAAA previously mentioned in step $E_2$ on the same FIG. 3, i.e. the above-mentioned value 00h.

In view of this assignment, all blocks $BL_0$, $BL_b$ to $BL_q$ are then considered as erased blocks and therefore available for future allocation, and for a write in the entire memory workspace reserved for each of these blocks.

As regards checking whether a byte belongs to the storage area allocated according to the method subject of this invention, the identification number of the corresponding application or data structure can be obtained using the following relation:

$ID\_A_k$=info block [(address_byte-storage area_start_address)/64]

The previous relation is obtained according to the mode of realisation described for blocks of 256 bytes per block and 4 information bytes in info block per current block considered.

The implementation of the method for dynamically allocating memory, subject of this invention, avoids or reduces fragmentation of the storage area managed. When creating an object or a variable type, a search is carried out in the info block list to find the first block belonging to the application or to the data structure which has sufficient free space to create this object or variable type. Under these conditions, a new block is only allocated to an application, or to a data structure, if the remaining space is insufficient for the object or variable type to be created in at least one of the blocks already allocated to this application or this data structure. Consequently, there are no objects or variable types which are not distributed over at least two non-consecutive blocks. Since the above-mentioned objects or variable types do not have to be stored in a specific order, any erased block, which is now therefore free, can always be reassigned and reallocated, either to data from applications or to object code from an application. The risk of fragmenting is therefore limited to the loading and frequent erasure of consecutive code blocks.

The memory fragmentation phenomenon can also be reduced by reallocating elementary memory blocks to object code packets, by rearrangement by translation.

As regards the block check procedure, we indicate that the checksum is calculated for each block subject to the allocation process, i.e. to each write of the block considered. However, there is no need to check the blocks on each read, which would cause a significant reduction in memory access speed.

In an implementation variant, we indicate that the checksum can be calculated on each read for blocks containing data considered to be critical, such as for example sensitive data of the OS or key values for which the identification number may be the value FDh.

As regards the periodic repetition of the checksum calculation on randomly selected blocks, we indicate that the period can be set to 50 ms for example. The calculation of the checksum for all blocks can also be implemented during very specific events of the onboard system, such as its change of life state in the field of application of smartcards, for example.

An example of installing and deinstalling applet type applications, by implementing the method for dynamically allocating memory by elementary memory blocks, according to the subject of this invention, will now be given, referring to FIGS. 4*a* and 4*b*. The applets may correspond to programs written in any type of high level language.

Figure 4A:
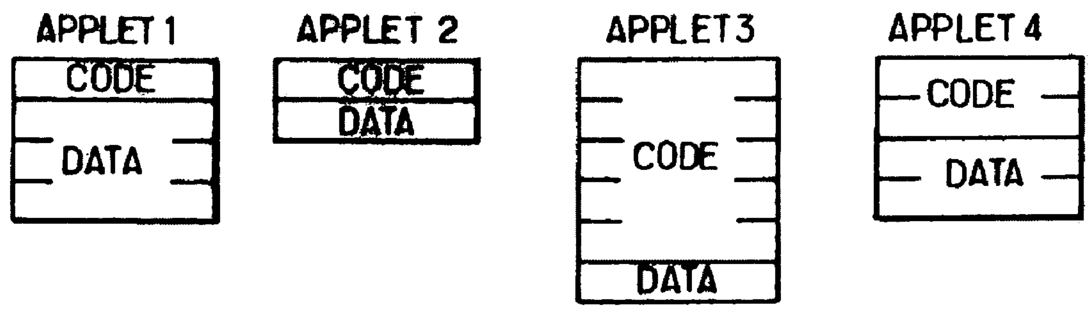
FIGS. 4*a* and 4*b* represent, as an illustration, memory occupation state diagrams, during an application installation/deinstallation process implemented, according to the method for dynamically allocating memory subject of this invention.

In reference to FIG. 4*a*, we consider 4 applets, designated by Applet 1, Applet 2, Applet 3 and Applet 4, each comprising:

TABLE I

| | |
|---|---|
| Applet 1 | 150 bytes of code, i.e. 1 block |
| | 600 bytes of data, i.e. 3 blocks |
| Applet 2 | 150 bytes of code, i.e. 1 block |
| | 150 bytes of data, i.e. 1 block |
| Applet 3 | 1100 bytes of code, i.e. 5 blocks |
| | 200 bytes of data, i.e. 1 block |
| Applet 4 | 400 bytes of code, i.e. 2 blocks |
| | 300 bytes of data, i.e. 2 blocks |

Figure 4B:
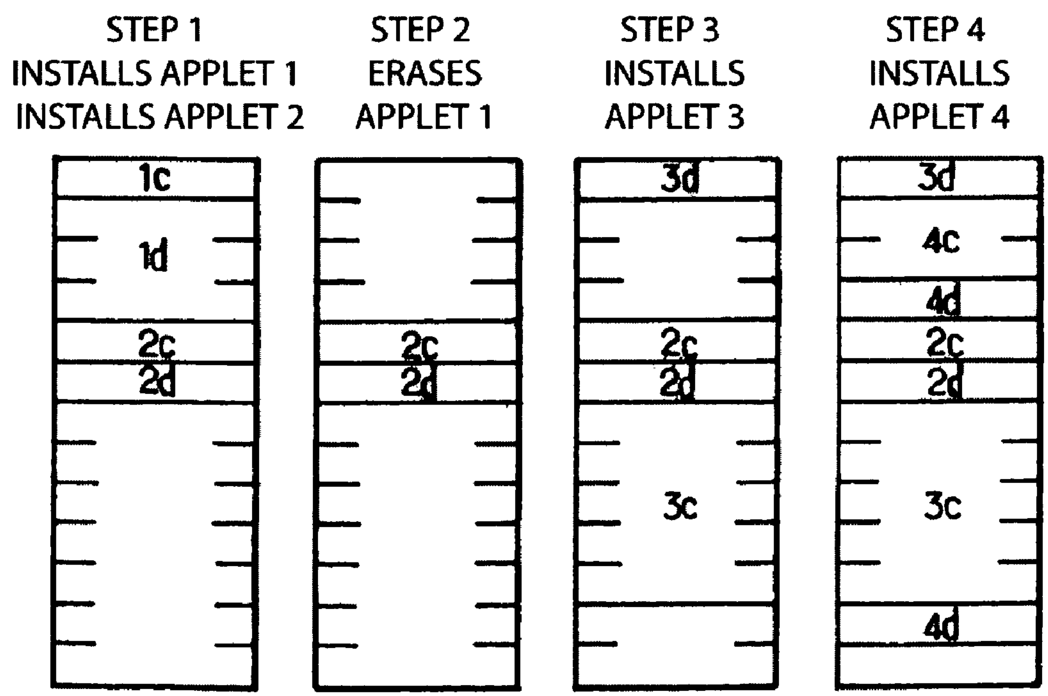

In reference to FIG. 4*b*, we indicate that step 1 corresponds to the installation of Applet 1 and Applet 2, step 2 to the erasure of Applet 1, step 3 to the installation of Applet 3 and step 4 to the installation of Applet 4.

The following table II gives the value, in hexadecimal notation, of the identification number $ID\_A_k$ where k takes values 1 to 4, value 00 in hexadecimal notation corresponding to the arbitrary value AAAA.

TABLE II

| | | | | | | | | | | | | | |
|---|---|---|---|---|---|---|---|---|---|---|---|---|---|
| Step 1 | 01 | 01 | 01 | 01 | 02 | 02 | 00 | 00 | 00 | 00 | 00 | 00 | 00 |
| Step 2 | 00 | 00 | 00 | 00 | 02 | 02 | 00 | 00 | 00 | 00 | 00 | 00 | 00 |
| Step 3 | 03 | 00 | 00 | 00 | 02 | 02 | 03 | 03 | 03 | 03 | 03 | 00 | 00 |
| Step 4 | 03 | 04 | 04 | 04 | 02 | 02 | 03 | 03 | 03 | 03 | 03 | 04 | 00 |

Figure 5:
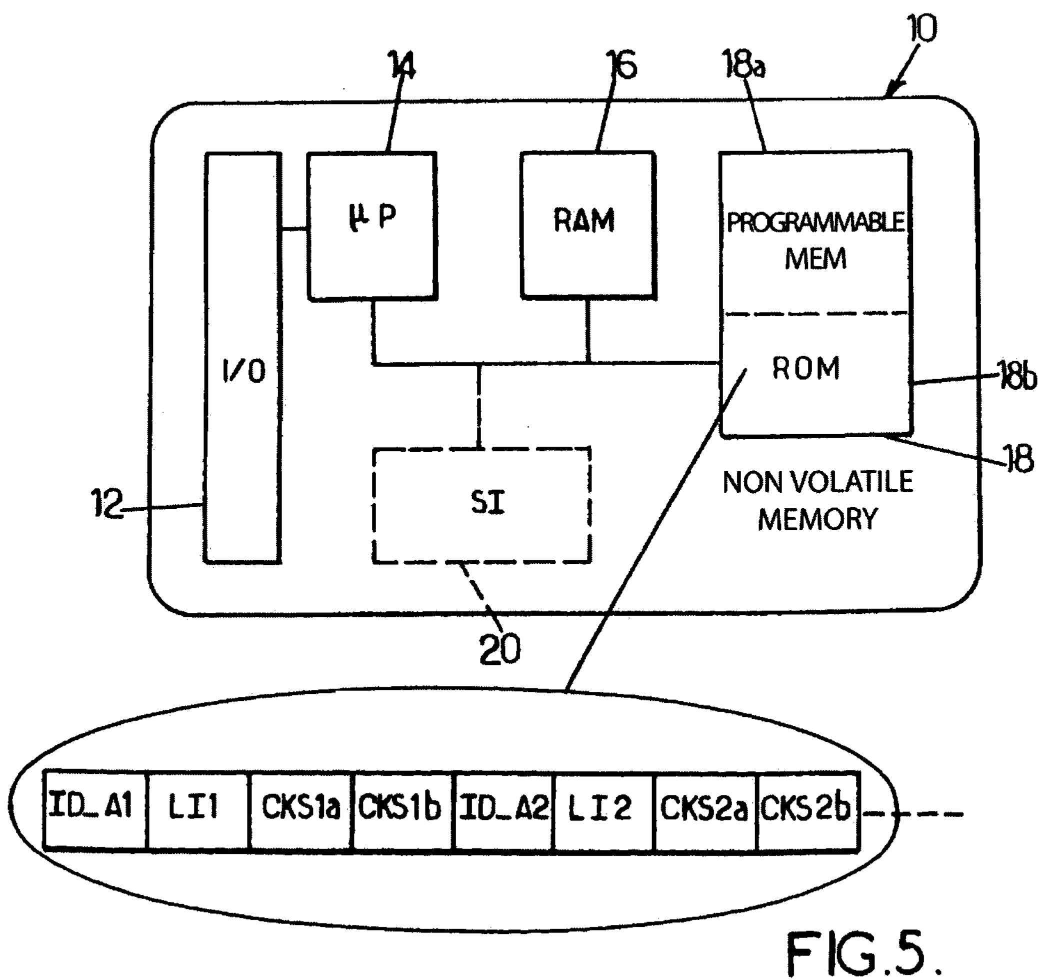
FIG. 5 represents, as a non-limiting example, an onboard system, such as a microprocessor or microcontroller card, comprising, stored in non volatile memory, a specific data table used to manage the memory workspace of this onboard system according to the method subject of this invention.

A specific multi-application onboard system used to implement the method for dynamically allocating memory according to the subject of this invention will now be described, in reference to FIG. 5.

Note that the corresponding onboard system is represented as a non-limiting example as a microprocessor or microcontroller card. This onboard system includes an operating system managing the input/output circuits of the random access memory and of the non volatile memory via the above-mentioned microprocessor.

In reference to the implementation of the method subject of this invention, it comprises in non volatile programmable memory $\mathbf{18}_a$, a table to manage the storage area by elementary memory blocks, this table comprising at least, for each elementary memory block $BL_l$ previously described in the description, a reference to an identification number of a data structure to which the corresponding elementary memory block has been allocated, and a value of memory workspace occupied in the corresponding elementary memory block allocated. The reference to the identification number of the data structure is written $ID\_A_1$, respectively $ID\_A_2$ and the value of memory workspace occupied is written $LI_1$ respectively $LI_2$ on FIG. 5.

In addition, as shown on the above-mentioned figure, the table may comprise, for each corresponding elementary memory block, a checksum for the elementary block allocated, these values being written $CKS_{1a}$ and $CKS_{1b}$, respectively $CKS_{2a}$ and $CKS_{2b}$. We indicate that, in the mode of realisation on FIG. 5, the checksum is encoded on 2 bytes.

When implementing the method subject of this invention, for an onboard system such as a smartcard, and for a non volatile memory $\mathbf{18}_a$ consisting of an EEPROM type programmable memory of size 32 kbytes, the above-mentioned table occupies a memory workspace corresponding to 32×kbytes/256×4=512 bytes. We note that the memory workspace used to manage this memory workspace, according to the method for dynamically allocating memory by elementary memory blocks according to the subject of this invention, occupies, since the above-mentioned table has to be stored, 1.56% of the memory actually available. This low value of the memory size occupied to implement the method subject of this invention is quite acceptable considering the fact that it is much easier to use and install a wide range of applications, whose number only depends on the size of the non volatile memory 18*a*.

The invention claimed is:

1. Method for dynamically allocating memory to one (or more) data structure(s) ($ID\_A_j$) identified by an identification number and stored as digital information packets in a storage area of an onboard system, wherein said storage area being subdivided into elementary memory blocks (BLI), and this method for dynamically allocating memory being implemented from at least one elementary memory block erasure instruction (E) and one elementary memory block allocation instruction (A), through which said elementary memory block is associated with a reference to said identification number, this method comprises the following steps:

a. to allocate an elementary memory block b. assign to said reference to said identification number the value of said identification number and, c. to erase an elementary memory block d. assign to said reference to said identification number an arbitrary value, different from any identification number.

2. The method according to claim 1, wherein to allocate an elementary memory block, said method must also comprise, prior to the step which consists in assigning to said reference to said identification number the value of said identification number, for any elementary memory block allocated, the following steps:

a. Check the identity of said reference to said identification number and of said identification number, and, if a positive response is obtained to this identity check, said current elementary memory block being at least partly allocated to this data structure, b. check that there is sufficient memory workspace in said current elementary memory block to store said digital information, and call an instruction to allocate the next elementary memory block, otherwise.

3. The method according to claim 1, wherein to erase an application identified by an identification number, said method consists in assigning to said reference to said identification number for all elementary memory blocks allocated to this application said arbitrary value.

4. The method according to claim 1, wherein after allocating an elementary memory block to an application and after storing by writing said digital information in said elementary memory block allocated, said method consists in addition in calculating a checksum for the elementary memory block.

5. The method according to claim 1, wherein independently of any allocation of an elementary memory block to a data structure, said method comprises in addition the following steps:

a. select, according to a random selection criterion, one of the elementary memory blocks allocated, and b. calculate a checksum for said elementary memory block allocated.

6. The method according to claim 5, wherein said method further comprises periodically triggering random selection and said checksum calculation at a given frequency.

7. An onboard system comprising a storage area allocated dynamically to one (or more) data structure(s) ($ID_{\_Aj}$) identified by an identification number and stored as digital information packets, said storage area being subdivided into elementary memory blocks (BLI), a reference to said identification number being associated with each block, wherein said reference has:

a. the value of said identification number when the elementary memory block is allocated b. an arbitrary value, different from any identification number, when the elementary memory block is erased.

8. An onboard system according to claim 7, wherein said system comprises in non volatile programmable memory a table to manage the storage area by elementary memory blocks, said table comprising at least, for each elementary memory block:

a. a reference to an identification number of a data structure to which the corresponding elementary memory block has been allocated;

b. a value of memory workspace occupied in said corresponding elementary memory block allocated.

9. An onboard system according to claim 8, wherein said table also comprises for each elementary memory block a checksum for the corresponding elementary memory block allocated.

* * * * *